2,937,173
INDOLINO AND TETRAHYDROQUINOLINO TRIAZINES

Seymour L. Shapiro, Hastings-on-Hudson, and Louis Freedman, Bronxville, N.Y., assignors to U.S. Vitamin & Pharmaceutical Corporation, a corporation of Delaware No Drawing. Application May 6, 1959
Serial No. 811,266

6 Claims. (Cl. 260—249.9)

This invention is concerned with novel triazine compounds which have central nervous system depressant, anti-inflammatory, and analgesic properties.

More specifically it relates to triazine compounds of the type shown by the formula

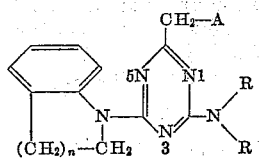

wherein $n$ is 1 and 2, R is hydrogen or methyl, and A is a substituted amino group. Generally, it is preferred that the amino group A be selected from the group consisting of primary amino and secondary amino radicals having not less than two and not more than eight carbon atoms and typical radicals include dimethylamino, pyrrolidino, morpholino, ethanolamino, diethanolamino, dimethylaminopropylamino, N-methylpiperazino, phenethylamino, amylamino and the like.

The new class of compounds are white crystalline solids which are readily rendered water-soluble as their salts with the strong mineral acids such as hydrochloric acid, hydrobromic acid, phosphoric acid and the like.

The compounds of this invention are distinguished by having at least three types of amino nitrogen attached to the triazine ring, the amino linkage at position 2, the heteroarylamino nitrogen at position 4 and the aminomethyl derivative at position 6 of the triazine ring.

For the synthesis of the compounds of this invention a multi-step procedure is required. Treatment of indoline (or tetrahydroquinoline) in an aqueous medium containing one equivalent of hydrochloric acid, and one equivalent of dicyandiamide (or dimethyldicyandiamide) yields the biguanide shown below, isolated as the hydrochloride.

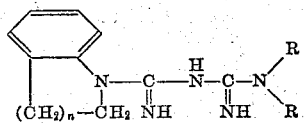

The biguanide as its free base is reacted in aqueous acetonitrile with chloroacetylchloride, using sodium hydroxide as an acid binder to afford the 2-amino (or dimethylamino)-4-indolino (or 4-tetrahydroquinolino)-6-chloromethyl-s-triazine;

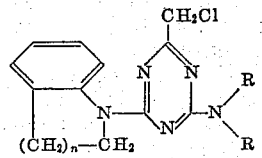

Alternatively, the reactant above may be prepared by reaction of the biguanide with ethyl chloroacetate following the procedures of Shapiro et al., J. Am. Chem. Soc., 76, 97 (1954).

The chloromethyl triazine upon reaction with an excess of the amine AH, yields the compounds of the present invention.

Typical of the compounds prepared in this invention are those listed in Table I.

TABLE I $n=1, R=H$

| A | M.P., °C. | Recrystallizing Solvent |
|---|---|---|
| Dimethylamino | 169–170 | ethyl acetate. |
| Ethanolamino | 165–168 | acetonitrile. |
| Amylamino | 131–134 | Do. |
| Pyrrolidino | 189–191 | isopropyl alcohol. |
| Morpholino | 178–180 | acetonitrile. |
| N-Ethylethanolamino | 125–126 | Do. |
| Dimethylaminopropylamino | 106–116 | methanol. |
| N-Methylpiperazino | 216–220 | ethanol. |
| N-(2-Hydroxyethyl)piperazino | 158–160 | acetonitrile. |
| β-Phenethylamino | 145–147 | Do. |

$n=1, R=CH_3$

| A | M.P., °C. | Recrystallizing Solvent |
|---|---|---|
| Dimethylamino | 119–120 | ethyl acetate. |
| Ethanolamino | 156–157 | Do. |
| Pyrrolidino | 229–234 | Do. |
| Diethanolamino | 93–94 | Do. |
| N-Methylpiperazino | 105–107 | Do. |

$n=2, R=H$

| A | M.P., °C. | Recrystallizing Solvent |
|---|---|---|
| Ethanolamino | 138–139 | ethyl acetate-hexane. |
| Diethanolamino | 103–105 | ethyl acetate. |
| Dimethylaminopropylamino | 126–128 | Do. |
| N-Methylpiperazino | 149–151 | Do. |

As an illustrative embodiment of the manner in which the invention may be practiced, the following examples are presented.

Example 1

A mixture of 119.2 g. (1 mole) of indoline, 84.2 g. (1 mole) of dicyandiamide and 333 ml. 3 N hydrochloric acid (1 mole) was heated under reflux for 6 hours. After standing 48 hours, 150 g. of product, the biguanide hydrochloride of the formula

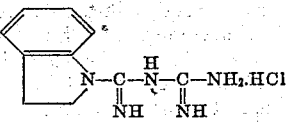

was collected by filtration, and recrystallized (ethanol-hexane), M.P. 228–230° C.

*Analysis.*—Calcd. for $C_{10}H_{14}ClN_5$: C, 50.1; H, 5.9; N, 29.2. Found: C, 50.6; H, 5.9; N, 29.3.

Example 2

In a similar manner the biguanide derived from tetrahydroquinoline of the formula

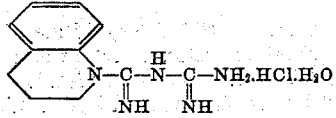

was obtained and recrystallized (propanol-hexane), M.P. 206–208° C.

The analyses indicated this compound to be the monohydrate.

*Analysis.*—Calcd. for $C_{11}H_{16}ClN_5 \cdot H_2O$: C, 48.6; H, 6.8; N, 25.8. Found: C, 48.3; H, 6.7; N, 26.4.

Example 3

A mixture of 40.7 g. (0.5 mole) of dimethylamine hydrochloride, 55 g. (0.5 mole) of sodium dicyanamide in 300 ml. of n-butanol and 30 ml. of water were heated under reflux for 5 hours. The formed sodium chloride was separated by filtration, and the filtrate concentrated to dryness under vacuum. The residue obtained was recrystallized (ethyl acetate-hexane), M.P. 165-169° C. and was dimethyldicyandiamide.

*Analysis.*—Calcd. for $C_4H_8N_4$: C, 42.8; H, 7.2; N, 50.0. Found: C, 42.7; H, 7.4; N, 49.4.

Example 4

A mixture of 21.4 g. (0.18 mole) of indoline, 20.0 g. (0.18 mole) of dimethyldicyandiamide (see Example 3) and 60 ml. (0.18 mole) of 3 N hydrochloric acid was heated under reflux for 6 hours. When cool, there was obtained 39.9 g. of the biguanide as the hydrochloride of the formula shown

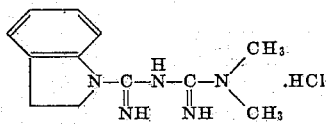

which was recrystallized (ethanol-hexane), M.P. 243–245° C.

*Analysis.*—Calcd. for $C_{12}H_{18}ClN_5$: C, 53.8; H, 6.8; N, 26.2. Found: C, 54.0; H, 6.9; N, 26.1.

Example 5

A solution of 13.8 g. (0.6 mole) of sodium methoxide in 480 ml. of methanol was chilled to −40° C. and 37.2 g. of ethyl chloroacetate added, followed by 70 g. (0.3 mole) of the biguanide of Example 1. The reaction mixture was stirred as it warmed to 20° C. over a period of 6 hours. A solution of 48 ml. of hydrochloric acid in 108 ml. of methanol was added and the reaction mixture stored at 10° C. for 20 hours. The formed precipitate was separated by filtration, rinsed with 500 ml. of acetone, and then suspended in 500 ml. of water which was adjusted to pH 6.0. The insoluble suspension of product, 2-amino-4-indolino-6-chloromethyl-s-triazine was filtered and dried, and weighed 44.5 g., M.P. >300° C.

*Analysis.*—Calcd. for $C_{12}H_{12}ClN_5$: C, 55.1; H, 4.6; N, 26.8; Cl, 13.6. Found: C, 54.8; H, 4.6; N, 26.9; Cl, 13.6.

Example 6

A mixture of 5.5 g. (0.0206 mole) of the biguanide of Example 4 was suspended in a mixture of 8 ml. of water and 12 ml. of acetonitrile. With continued stirring and cooling (to 10° C.) 7.5 ml. of 40% sodium hydroxide solution was added, followed by addition of 3.4 g. (0.03 mole) of chloroacetyl chloride in 10 ml. of acetonitrile over 20 minutes. After the addition was complete, stirring was continued at 20° C. for one hour, and the formed precipitate separated. After recrystallization (acetonitrile) 3.1 g. of 2-dimethylamino-4-indolino-6-chloromethyl-s-triazine, was obtained, M.P. 140–142° C.

*Analysis.*—Calcd. for $C_{14}H_{16}ClN_5$: C, 58.0; H, 5.6; Cl, 12.3. Found: C, 57.8; H, 5.6; Cl, 12.3.

Example 7

A mixture of 27.1 g. (0.1 mole) of the biguanide of Example 2 in 40 ml. of water, 60 ml. of acetonitrile and 20 ml. (0.2 mole) of 40% sodium hydroxide was cooled to 10° C. and treated dropwise with a solution of 13.5 g. (0.12 mole) of chloroacetyl chloride in 25 ml. of acetonitrile with continued stirring and cooling over a period of 30 minutes. After 2 hours stirring at 10° C., the reaction mixture was allowed to warm to 20° C. and decanted into 500 ml. of water. The precipitate was filtered, resuspended in 200 ml. of water and filtered. The product, 2-amino-4-tetrahydroquinolino-6-chloromethyl-s-triazine was recrystallized (acetonitrile) and melted at 135–147° C.

*Analysis.*—Calcd. for $C_{13}H_{14}ClN_5$: C, 56.6; H, 5.1; N, 25.4; Cl, 12.9. Found: C, 56.8; H, 5.3; N, 24.9; Cl, 13.0.

In a similar manner there is prepared 2-dimethylamino-4-tetrahydroquinolino-6-chloromethyl-s-triazine.

Example 8

A mixture of 2.6 g. of 2-amino-4-indolino-6-chloromethyl-s-triazine and 6 ml. of ethyl-ethanolamine was warmed to effect complete solution and then heated in an oil bath maintained at 100° C. for 5 minutes. When cool, the reaction mixture was decanted into 100 ml. of water. The formed product, 2-amino-4-indolino-6-([N-ethyl]ethanolaminomethyl)-s-triazine, 3.4 g. was recrystallized (acetonitrile) and melted at 125–126° C.

*Analysis.*—Calcd. for $C_{16}H_{22}N_6O$: C, 61.1; H, 7.1; N, 26.7. Found: C, 61.2; H, 7.2; N, 26.7.

This compound had an $LD_{min}$ of 200 mg./kg. and showed an anti-inflammatory effect of 14 units per gram.

Example 9

A mixture of 2.9 g. of 2-dimethylamino-4-indolino-6-chloromethyl-s-triazine and 6 ml. of N-methylpiperazine was processed as described under Example 8 to afford 3.4 g. of 2-dimethylamino-4-indolino-6-(N-methylpiperazinomethyl)-s-triazine which was recrystallized (ethyl acetate) and melted at 105–107° C.

*Analysis.*—Calcd. for $C_{19}H_{27}N_7$: C, 64.6; H, 7.7; N, 27.7. Found: C, 63.9; H, 7.5; N, 28.1.

This compound had an $LD_{min}$ of 400 mg./kg., an analgesic $ED_{50}$ of 96 mg./kg., and effected a 52% reduction in motor activity at 100 mg./kg.

Example 10

A mixture of 2.75 g. of 2-amino-4-tetrahydroquinolino-6-chloromethyl-s-triazine and 6 ml. of dimethylaminopropylamine was processed as described under Example 8 to afford the product 2-amino-4-tetrahydroquinolino-6-(dimethylaminopropylaminomethyl)-s-triazine which was recrystallized (ethyl acetate) and melted at 126–128° C.

*Analysis.*—Calcd. for $C_{18}H_{27}N_7$: C, 63.3; H, 8.0; N, 28.7. Found: C, 63.4; H, 8.1; N, 28.8.

This compound has an $LD_{min}$ of 350 mg./kg. and effected a 47% reduction in motor activity at 50 mg./kg.

Example 11

A mixture of 2.6 g. of 2-amino-4-indolino-6-chloromethyl-s-triazine and 6 ml. of N-methylpiperazine was processed as described under Example 8 to afford 2.1 g. of 2-amino-4-indolino-6-(N-methylpiperazinomethyl)-s-triazine which was recrystallized (ethanol) and melted at 216–220° C.

*Analysis.*—Calcd. for $C_{17}H_{23}N_7$: C, 62.7; H, 7.1. Found: C, 62.2; H, 7.3.

This compound had an $LD_{min}$ of 200 mg./kg., showed 94% protection at 50 mg./kg. in the phenylquinone anti-inflammatory test, and effected a 31% reduction in motor activity at 50 mg./kg.

Example 12

A mixture of 2.9 g. of 2-dimethylamino-4-indolino-6-chloromethyl-s-triazine and 10 g. of dimethylamine in a pressure bomb was heated at 100° C. for 30 minutes. When cooled, the reaction mixture was decanted into 100 ml. of water, and 3.4 g. of product, 2-dimethylamino-4-indolino-6-(dimethylaminomethyl)-s-triazine which separated, was recrystallized (ethyl acetate), and melted at 119–120° C.

*Analysis.*—Calcd. for $C_{16}H_{22}N_6$: C, 64.4; H, 7.4; N, 28.2. Found: C, 63.9; H, 7.7; N, 27.9.

This compound had an $LD_{min}$ of 300 mg./kg., and showed at 50 mg./kg. 100% protection in the phenylquinone anti-inflammatory test.

The pharmacological tests described above were all established by standard procedures, and all dosage levels used refer to subcutaneous administration. The $LD_{min}$ is the minimum dosage lethal to mice; the anti-inflammatory effect was established by the following procedures:

(*a*) Ungar et al., Am. J. Physiol., 166, 340 (1951).

(*b*) French et al., Proc. Soc. Exp. Biol. Med., 89, 41 (1955).

(*c*) Siegmund et al., ibid., 95, 729 (1957).

The reduction of motor activity which reflects central nervous system depression was established as described by Shapiro et al., J. Am. Chem. Soc., 80, 1648 (1958), and the analgesic effective dose for 50% analgesia (analgesic $ED_{50}$) by the method of Bianchi et al., Brit. J. Pharmacol., 9, 280 (1954).

The novel compounds of this invention can be combined with solid or liquid pharmaceutical carriers and formulated into the form of tablets, powder packets or capsules, or dissolved in suitable solvents for oral and parenteral administration for human and veterinary use.

It is to be understood that it is intended to cover all changes and modifications of the examples herein chosen for the purpose of illustration which do not constitute departures from the spirit and scope of the invention.

We claim:
1. A compound of the formula

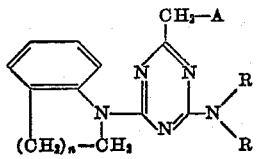

wherein R is selected from the group consisting of hydrogen and methyl, A is selected from the group consisting of dimethylamino, pyrrolidino, morpholino, ethanolamino, diethanolamino, dimethylaminopropylamino, N-methylpiperazino, phenethylamino, and amylamino and n is a small whole number selected from the group consisting of one and two.

2. 2 - amino - 4 - indolino - 6 - ([N - ethyl]ethanolaminomethyl)-s-triazine.

3. 2 - dimethylamino - 4 - indolino - 6 - (N - methylpiperazinomethyl)-s-triazine.

4. 2 - amino - 4 - tetrahydroquinolino - 6 - (dimethylaminopropylaminomethyl)-s-triazine.

5. 2 - amino - 4 - indolino - 6 - (N - methylpiperazinomethyl)-s-triazine.

6. 2 - dimethylamino - 4 - indolino - 6 - (dimethylaminomethyl)-s-triazine.

References Cited in the file of this patent

FOREIGN PATENTS

| | | |
|---|---|---|
| 168,063 | Austria | Apr. 10, 1951 |
| 794,398 | Great Britain | Apr. 30, 1958 |